(12) United States Patent
Bohling et al.

(10) Patent No.: US 9,745,492 B2
(45) Date of Patent: Aug. 29, 2017

(54) PIGMENTED PAINT FORMULATION WITH A PHOSPHORUS ACID FUNCTIONALIZED LATEX BINDER AND AN ASSOCIATIVE THICKENER

(71) Applicant: Rohm and Haas Company, Philadelphia, PA (US)

(72) Inventors: James C. Bohling, Lansdale, PA (US); Arnold S. Brownell, Lansdale, PA (US); Jihui Guo, North Wales, PA (US); Kevin J. Henderson, Phoenixville, PA (US); Ericka Lynn Killian, Collegeville, PA (US); John J. Rabasco, Allentown, PA (US); Daniel A. Saucy, Harleysville, PA (US); Jordan Stracke, Spring City, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/262,566

(22) Filed: Sep. 12, 2016

(65) Prior Publication Data

US 2017/0081547 A1    Mar. 23, 2017

Related U.S. Application Data

(60) Provisional application No. 62/219,892, filed on Sep. 17, 2015.

(51) Int. Cl.
   *C08K 9/00*       (2006.01)
   *C09D 133/12*    (2006.01)
   *C09D 5/00*      (2006.01)

(52) U.S. Cl.
   CPC ............ *C09D 133/12* (2013.01); *C09D 5/00* (2013.01)

(58) Field of Classification Search
   CPC ................ C09D 17/003; C09D 17/001; C09D 101/286; C09C 1/3684
   See application file for complete search history.

(56) References Cited

U.S. PATENT DOCUMENTS

| | | | |
|---|---|---|---|
| 4,078,028 A | 3/1978 | Kishi | |
| 4,155,892 A | 5/1979 | Emmons et al. | |
| 7,081,488 B2 | 7/2006 | Bardman et al. | |
| 7,179,531 B2 | 2/2007 | Brown et al. | |
| 8,034,869 B2 | 10/2011 | Bobsein et al. | |
| 8,710,133 B2 | 4/2014 | Bohling et al. | |
| 8,907,004 B2 | 12/2014 | Henderson et al. | |
| 9,505,944 B2 * | 11/2016 | Bohling | C09D 131/04 |
| 2003/0018103 A1 | 1/2003 | Bardman et al. | |
| 2004/0054063 A1 | 3/2004 | Brown et al. | |
| 2015/0000546 A1 | 1/2015 | Kotefski et al. | |
| 2015/0118483 A1 | 4/2015 | Masuda et al. | |
| 2015/0361291 A1 | 12/2015 | Brownell et al. | |
| 2016/0040004 A1 | 2/2016 | Brownell et al. | |
| 2016/0152854 A1 | 6/2016 | Bohling et al. | |
| 2017/0081529 A1 * | 3/2017 | Bohling | C09D 7/002 |

FOREIGN PATENT DOCUMENTS

| | | |
|---|---|---|
| JP | 2007206061 A | 8/2007 |
| WO | 2015138117 A1 | 9/2015 |

* cited by examiner

*Primary Examiner* — Hannah Pak
(74) *Attorney, Agent, or Firm* — Reid S. Willis

(57) ABSTRACT

The present invention relates to a composition comprising an aqueous dispersion of an associative thickener having a hydrophobic portion with a calculated log P in the range of from 2.7 to 4.8; and composite particles comprising phosphorus acid functionalized polymer particles adsorbed to the surfaces of $TiO_2$ particles. The composition of the present invention provides formulators with flexibility in their use of low and mid shear rate thickeners to balance paint performance properties.

7 Claims, No Drawings

PIGMENTED PAINT FORMULATION WITH A PHOSPHORUS ACID FUNCTIONALIZED LATEX BINDER AND AN ASSOCIATIVE THICKENER

BACKGROUND OF THE INVENTION

The present invention relates to a pigmented paint formulation containing a phosphorus acid functionalized latex binder and an associative thickener that is designed to give formulators flexibility in targeting a desired Stormer viscosity of the composition, particularly when elevated ICI viscosity is desired.

Titanium dioxide ($TiO_2$) is widely used to create opacity in paint formulations due to its high index of refraction. The rapid rise in the cost in $TiO_2$ has led to the search for more efficient ways to reduce concentrations of this pigment without sacrificing hiding. Efficiency can be achieved by improving the spacing between $TiO_2$ particles, for example, by adsorbing phosphorus acid functionalized emulsion polymer particles to the surfaces of the $TiO_2$ particles. (See, for example, U.S. Pat. No. 7,081,488, U.S. Pat. No. 7,179,531, and US 2015/000546 A1). The resulting composite structures exhibit an increase in viscosity efficiency, which may adversely affect a formulator's ability to tailor the KU rheological response to a desired viscosity using a traditional thickener such as a hydrophobically modified ethylene oxide urethane (HEUR) polymer thickener.

It would therefore be desirable to discover a composition that provides both efficient use $TiO_2$ and KU building capability. Such a composition would facilitate viscosity adjustment of a paint formulation at high shear rates in the presence of composite particles without exceeding viscosity targets at low and mid shear rates, and would have the added benefit of increased flexibility in the use of low and mid shear rate thickeners to balance other paint performance properties.

SUMMARY OF THE INVENTION

The present invention addresses a need in the art by providing a composition comprising an aqueous dispersion of a) from 0.02 to 2 weight percent, based on the weight of the composition, of an associative thickener having a hydrophobic portion with a calculated log P in the range of from 2.7 to 4.8; and b) from 5 to 60 weight percent, based on the weight of the composition, of composite particles comprising phosphorus acid functionalized polymer particles adsorbed to the surfaces of $TiO_2$ particles; wherein the volume solids content of the composition is in the range of from 30 to 44 volume percent, with the proviso that when the volume solids content is in the range of from 30 to 36 volume percent, the calculated log P of the hydrophobic portion of the associative thickener is in the range of from 4.0 to 4.8.

DETAILED DESCRIPTION OF THE INVENTION

The present invention is a composition comprising an aqueous dispersion of a) from 0.02 to 2 weight percent, based on the weight of the composition, of an associative thickener having a hydrophobic portion with a calculated log P in the range of from 2.7 to 4.8; and b) from 5 to 60 weight percent, based on the weight of the composition, of composite particles comprising phosphorus acid functionalized polymer particles adsorbed to the surfaces of $TiO_2$ particles; wherein the volume solids content of the composition is in the range of from 30 to 44 volume percent, with the proviso that when the volume solids content is in the range of from 30 to 36 volume percent, the calculated log P of the hydrophobic portion of the associative thickener is in the range of from 4.0 to 4.8.

As associative thickener comprises a water soluble polymeric backbone with terminal or internal hydrophobic groups or both. Preferably, the concentration of the associative thickener is from 0.1 to 1 weight percent. Examples of suitable backbones include polyether, polymethacrylamide, polysaccharide, or polyvinyl backbones, preferably, a polyether backbone. More preferably, the associative thickener is a hydrophobically modified alkylene oxide urethane polymer, most preferably a hydrophobically modified ethylene oxide urethane polymer (a HEUR). This polymer may be prepared by contacting together under reactive conditions a) a diisocyanate; b) a water-soluble polyalkylene glycol; and c) a capping agent. Examples of suitable diisocyanates include 1,4-tetramethylene diisocyanate, 1,6-hexamethylene diisocyanate (HDI), 2,2,4-trimethyl-1,6-diisocyanatohexane, 1,10-decamethylene diisocyanate, 4,4'-methylenebis(isocyanatocyclohexane), 2,4'-methylenebis(isocyanatocyclohexane), 1,4-cyclohexylene diisocyanate, 1-isocyanato-3-isocyanatomethyl-3,5,5-trimethylcyclohexane (IPDI), m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate.

A water-soluble polyalkylene glycol refers to water-soluble polyethylene oxides, water-soluble polyethylene oxide/polypropylene oxide copolymers, and water-soluble polyethylene oxide/polybutylene oxide copolymers. As used herein, the term propylene oxide refers to either a polymer having —(OCH$_2$CH$_2$CH$_2$)— and/or —(OCH(CH$_3$)CH$_2$)— repeating groups.

Preferred water-soluble polyalkylene oxides are polyethylene glycols, particularly polyethylene glycols having a weight average molecular weight in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, Mich.).

A branched hydrophobically modified alkylene oxide urethane polymer may be prepared, for example, by reacting a compound with at least three isocyanate groups with a stoichiometric excess of a water-soluble polyalkylene glycol, followed by reaction of the intermediate with a stoichiometric excess of a diisocyanate to form a branched polyurethane polymer with isocyanate groups, followed by capping of the isocyanate groups with a capping agent. Examples of preferred compounds with three isocyanate groups include cyanurate and biuret trimers such as HDI isocyanurate (trimer), and IPDI isocyanurate (trimer), as illustrated:

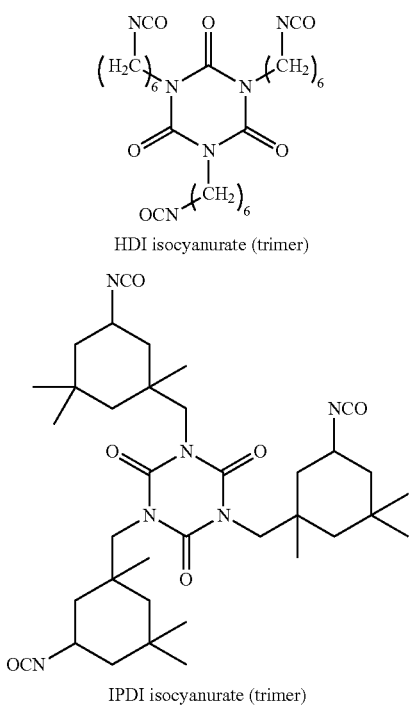

HDI isocyanurate (trimer)

IPDI isocyanurate (trimer)

The hydrophobic portion from which calculated log P (cLog P) is derived is characterized by either of the following formulas:

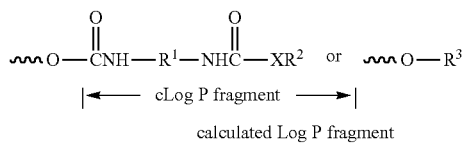

where the oxygen atom is covalently bonded to the polymer backbone (squiggly line) through a saturated carbon atom; where $R^1$ is a divalent group and $R^2$ and $R^3$ are monovalent groups selected to achieve the desired cLog P.

Preferably, $R^1$ is a $C_4$-$C_{14}$ alkyl, a $C_5$-$C_8$ cycloalkyl, or a combination of $C_1$-$C_9$ alkyl and $C_5$-$C_7$ cycloalkyl groups.

Preferably, $R^2$ is a $C_3$-$C_{10}$ alkyl, a $C_5$-$C_8$ cycloalkyl, or a benzyl group; X is O or $NR^{2'}$ where $R^{2'}$ is H or a monovalent group selected to achieve the desired cLog P. Preferably $R^{2'}$ is H, a $C_1$-$C_6$-alkyl, a benzyl, or a $C_5$-$C_8$ cycloalkyl group. Alternatively, $R^2$ is a tertiary amine containing alkyl, cycloalkyl, or aromatic group that is within the scope of the desired cLog P range of this invention.

$R^3$ is preferably a $C_7$-$C_{11}$-alkyl, a dibenzylamino-$C_2$-$C_5$-alkyl, a di-$C_4$-$C_6$-alkylamino-$C_1$-$C_4$— alkyl, a $C_6$-$C_8$-alkylphenyl group.

The cLog P is determined using ChemBioDraw Ultra 13.0 (PerkinElmer), which uses a chemical fragment algorithm method for assessing the partition coefficient of a molecule based on its constituent parts.

Examples of combinations of $R^1$, $R^2$, and $R^{2'}$ groups within the scope of the desired cLog P range are as follows:

| $R^1$ | $R^2$ | $R^{2'}$ | X | cLog P |
|---|---|---|---|---|
| -$H_{12}$MDI- | $CH_3(CH_2)_3$— | — | O | 4.68 |
| -$H_{12}$MDI- | $CH_3(CH_2)_2$— | — | O | 4.15 |
| -IPDI- | benzyl | — | O | 3.87 |
| -IPDI- | $CH_3(CH_2)_5$— | — | O | 4.75 |
| -IPDI- | $CH_3(CH_2)_4$— | — | O | 4.22 |
| -IPDI- | $CH_3(CH_2)_3$— | — | O | 3.69 |
| -HDI- | $CH_3(CH_2)_7$— | — | O | 4.34 |
| -HDI- | $CH_3(CH_2)_6$— | — | O | 3.81 |
| -HDI- | $CH_3(CH_2)_5$— | — | O | 3.29 |
| -HDI- | $CH_3(CH_2)_4$— | — | O | 2.76 |
| -HDI- | $CH_3(CH_2)_3$— | $CH_3(CH_2)_3$— | $NR^{2'}$ | 3.16 |
| -HDI- | $CH_3(CH_2)_4$— | $CH_3(CH_2)_4$— | $NR^{2'}$ | 3.76 |
| -HDI- | $CH_3(CH_2)_5$— | H | $NR^{2'}$ | 2.90 |
| -HDI- | $CH_3(CH_2)_6$— | H | $NR^{2'}$ | 3.42 |
| -HDI- | $CH_3(CH_2)_7$— | H | $NR^{2'}$ | 3.95 |
| -HDI- | benzyl | benzyl | $NR^{2'}$ | 3.42 |
| -HDI- | cyclohexyl | cyclohexyl | $NR^{2'}$ | 4.05 |
| -HDI- | (benzyl)$_2$NCH$_2$CH$_2$— | — | O | 4.62 |
| -$H_{12}$MDI- | benzyl | $CH_3$— | $NR^{2'}$ | 4.37 |
| -$H_{12}$MDI- | cyclohexyl | H | $NR^{2'}$ | 4.74 |
| -IPDI- | $CH_3(CH_2)_3$— | $CH_3(CH_2)_3$— | $NR^{2'}$ | 4.62 |
| -IPDI- | $CH_3(CH_2)_5$— | H | $NR^{2'}$ | 4.36 | where —$H_{12}$MDI— refers to fragments of isomers of methylenebis(isocyanatocyclohexane):

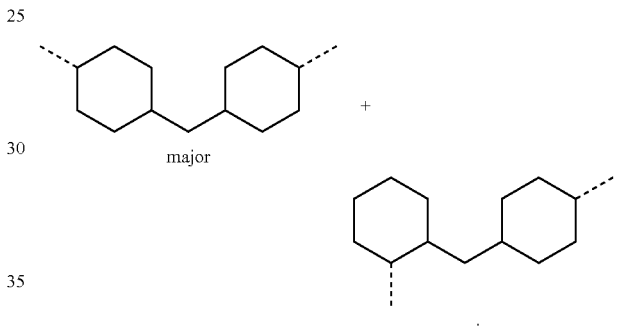

—IPDI— refers to a fragment of 1-isocyanato-3-isocyanatomethyl-3,5,5-trimethylcyclohexane:

—HDI— refers to a fragment of hexamethylene diisocyanate:

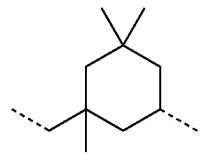

where the dotted lines represent the points of attachment of $R^1$ to the NH groups.

Examples of suitable —$OR^3$ groups include —O-n-undecyl (cLog P=4.42), —O-n-decyl (cLog P=3.89), —O-n-nonyl (cLog P=3.36), —O-n-octyl (cLog P=2.83), —O-2-ethylhexyl (cLog P=2.70), —O-3,5,5-trimethylhexyl (cLog P=2.97), —O-3,7-dimethyloctyl (cLog P=3.63), —O-dibenzylaminoethyl (cLog P=3.10), —O-2-propylheptyl (cLog P=3.76), —O-diamylaminoethyl (cLog P=3.76), —O-n-octylphenyl (cLog P=4.77), and —O-2,6-dimethylheptyl (cLog P=3.10).

The preferred cLog P of the fragment depends on the volume solids content of the composition. When the volume solids is from 30 to 36 volume percent, the cLog P of the fragment is from 4.0, and preferably from 4.2, to 4.8, preferably to 4.7; when the volume solids is from 36 to 44 volume percent, the cLog P of the fragment is from 2.7, preferably from 3.0, and more preferably from 3.5 to 4.8, preferably to 4.7.

The phosphorus acid functionalized polymer particles are spherical and can be prepared by a variety of emulsion polymerization techniques, such as those disclosed in US 2012/0058277 A1.

In a preferred method of preparing the spherical phosphorus acid functionalized polymer particles, first monomers comprising a) from 0.5, and more preferably from 1, to 15 more preferably to 10, and most preferably to 7 weight percent of a phosphorus acid monomer or a salt thereof; b) from 0.2, and more preferably from 0.5, to 20, preferably to 10, and more preferably to 4 weight percent of a carboxylic acid monomer or a sulfur acid monomer or salts thereof or combinations thereof; and c) from 50 to 95 weight percent structural units of a polymerizable ethylenically unsaturated bulk monomer are copolymerized under emulsion polymerization conditions. As used herein, a polymerizable ethylenically unsaturated bulk monomer refers to a styrene monomer or an acrylate monomer or a combination thereof.

Preferred polymerizable ethylenically unsaturated bulk monomers include a combination of the following monomers: i) from methyl methacrylate or styrene or a combination thereof at a concentration preferably in the range of from 35 weight percent, to 74.9 weight percent, more preferably to 65 weight percent, and most preferably to 55 weight percent based on the weight of the first monomers; and ii) ethyl acrylate, butyl acrylate, or 2-ethylhexyl acrylate or a combination thereof, preferably, at a concentration in the range of from 25 weight percent, more preferably from 45 weight percent to preferably 64.9, and more preferably to 60 weight percent, based on the weight of the first monomers. A more preferred combination of bulk monomers is methyl methacrylate or styrene or a combination thereof with ethyl acrylate, butyl acrylate, or 2-ethylhexyl acrylate or a combination thereof, with methyl methacrylate and butyl acrylate being especially preferred.

As used herein, the term "structural unit" of the named monomer, refers to the remnant of the monomer after polymerization. For example, a structural unit of methyl methacrylate is as illustrated:

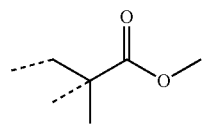

structural unit of methyl methacrylate
where the dotted lines represent the points of attachment of the structural unit to the polymer backbone.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

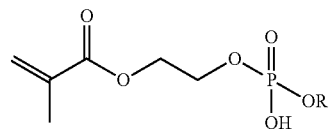

where R is H or

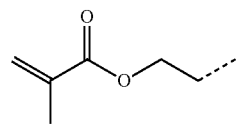

wherein the dotted line represents the point of attachment to the oxygen atom.

The first monomers are advantageously polymerized under emulsion polymerization conditions followed by addition of second monomers and a second stage polymerization. Alternatively, the second monomers can be polymerized in a first stage followed by polymerization of the first monomers in a second stage. The second monomers preferably comprise the same ranges of monomers as the first monomers except that the second monomers are preferably substantially free of phosphorus acid monomers. As used herein, the term "substantially free of phosphorus acid monomers" means that the second monomers comprise less than 0.1, more preferably less than 0.01 weight percent structural units of a phosphorus acid monomer, based on the weight of the second monomers. The second monomers most preferably include no structural units of a phosphorus acid monomer.

The composite can be prepared by mixing the aqueous dispersion of the phosphorus acid functionalized polymer particles with TiO$_2$ particles in any order and optionally in the presence of other ingredients used in a paint formulation. The preferred concentration of the composite particles in the composition is from 20 to 40 weight percent, based on the weight of the composition.

The hydrophobically modified alkylene oxide urethane polymer rheology modifier, preferably the HEUR, is advantageously combined with the aqueous dispersion of the composite and other ingredients selected from the group consisting of dispersants, defoamers, surfactants, solvents, non-phosphorus acid functionalized binders, additional thickeners, extenders, coalescents, biocides, and colorants.

A water-based paint formulation that contains the above-described composite and rheology modifier has a Stormer viscosity that is sufficiently low that a formulator can add from 0.2 to 4.0 dry lbs/100 gal (0.2 g to 4.8 dry g/L) of KU builder to increase Stormer viscosity to the desired level. KU builders offer performance advantages in formulated paints through improved heat age stability, viscosity retention upon tinting, in-can feel, or syneresis resistance. The flexibility to choose from a range of KU builders for a given formulation is also advantageous for tailoring sag resistance and the flow/leveling performance.

EXAMPLES

Abbreviations

| | |
|---|---|
| CARBOWAX ™ 8000 Polyethylene Glycol | PEG 8000 |
| DESMODUR W Diisocyanate | $H_{12}$MDI |
| Hexamethylene diisocyanate | HDI |
| DESMODUR N3600 HDI Trimer | HDI Trimer |
| Isophorone diisocyanate | IPDI |
| Butylated Hydroxytoluene | BHT |
| Pigment Volume Concentration | PVC |
| Volume Solids | VS |
| ACRYSOL ™ RM-995 Rheology Modifier | RM-995 |

ACRYSOL and CARBOWAX are Trademarks of The Dow Chemical Company or Its Affiliates.

Intermediate 1—Preparation of PEM-Functionalized Latex Binder

A first monomer emulsion was prepared by mixing deionized water (160.0 g), Disponil FES 32 surfactant (38.1 g, 30% active), butyl acrylate (323.6 g), methyl methacrylate (396.2 g), and methacrylic acid (2.9 g). A second monomer emulsion was prepared by mixing deionized water (272.1 g), Disponil FES 993 surfactant (37.5 g, 30% active), phosphoethyl methacrylate (29.8 g, 60% active), butyl acrylate (452.7 g), methyl methacrylate (422.4 g), acetoacetoxyethyl methacrylate (74.5 g), and methacrylic acid (9.9 g).

Deionized water (1106.3 g) and Disponil FES 32 surfactant (2.3 g, 30% active) were added to a 5-L, four-necked round-bottom flask equipped with a paddle stirrer, a thermometer, nitrogen inlet, and a reflux condenser. The contents of the flask were heated to 85° C. under a $N_2$ atmosphere, and stirring was initiated. A portion of the first monomer emulsion (110.4 g) was added to the flask followed by a rinse of DI water (5.0 g). A solution of sodium persulfate (5.4 g) dissolved in deionized water (33.9 g), followed by a rinse of deionized water (6.7 g) was subsequently added to the reactor. After stirring for 10 min, the remainder of the first monomer emulsion was added over 45 min followed by a DI water rinse (27.0 g). An initiator solution of sodium persulfate (0.58 g) dissolved in DI water (31.7 g) was added separately added over 45 min. Stirring was continued at 85° C. for 15 min.

The second monomer emulsion and an initiator solution containing sodium persulfate (0.99 g) dissolved in DI water (52.8 g) were added linearly and separately to the vessel over 75 min. The temperature was maintained at 85° C. The second monomer emulsion vessel was rinsed to the reactor with deionized water (27 g). When all additions were complete, the contents of the flask were cooled to 65° C. and a catalyst/activator pair was added to the flask to reduce residual monomer. The polymer was then neutralized to pH 9 with dilute aqueous ammonium hydroxide. The measured particle size was 112 nm as determined using a B190 Plus Particle Size Analyzer, and the solids content was 46.1%.

RM1—Preparation of a Rheology Modifier with cLog P of 4.34

PEG 8000 (1751.1 g) was heated to 110° C. in vacuo in a batch melt reactor for 2 h. The reaction mixture was cooled to 85° C. BHT (0.184 g) and 1-octanol (29.66 g) were added to the reactor and the reaction mixture was stirred for 5 min. HDI (52.68 g) was then added to the reactor followed by 5 min of stirring. Bismuth octoate (28% Bi, 4.38 g) was then added to the reactor and the resulting mixture was stirred for 10 min at 85° C. The resulting molten polymer was removed from the reactor and cooled. Prior to testing in coating formulations, portions of this solid polymer were then dissolved in water to form a solution containing 25 wt % polymer based on the total weight of the solution.

RM2—Preparation of a Rheology Modifier with cLog P of 4.68

PEG 8000 (1700.0 g) was heated to 110° C. in vacuo in a batch melt reactor for 2 h. After cooling the reactor contents to 85° C., BHT (0.179 g), butanol (12.87 g), $H_{12}$MDI (62.57 g), and HDI Trimer (7.95 g) were added sequentially to the reactor and allowed to mix for 5 min. Bismuth octoate (28% Bi, 4.25 g) was then added to the reactor and the temperature of the mixture was maintained at 85° C. with stirring for 10 min. The resulting molten polymer was removed from the reactor and cooled. Prior to testing in coating formulations, portions of this solid polymer were then dissolved in water to form a solution containing 20 wt % polymer based on the total weight of the solution.

RM3—Preparation of a Rheology Modifier with cLog P of 5.74

PEG 8000 (1711.9 g) was heated to 110° C. in vacuo in a batch melt reactor for 2 h. While maintaining a reaction temperature of 110° C., BHT (0.182 g) and hexanol (18.91 g) were added to the reactor and the reaction mixture was stirred for 5 min. $H_{12}$MDI (77.85 g) was then added to the reactor followed by 5 min of stirring. Bismuth octoate (28% Bi, 4.28 g) was then added to the reactor and the resulting mixture was stirred for 10 min at 110° C. Subsequently, hexanol (3.26 g) was added to the reactor and mixing continued for another 10 minutes at 110° C. The resulting molten polymer was removed from the reactor and cooled. Prior to testing in coating formulations, portions of this solid polymer were then dissolved in water to form a solution containing 20 wt % polymer based on the total weight of the solution.

RM4—Preparation of a Rheology Modifier with cLog P of 5.40

PEG 8000 Polyethylene Glycol (1700.0 g) and LUMULSE POE(26) glycerine (43.36 g) were heated to 110° C. in vacuo in a batch melt reactor for 2 h. After cooling the reactor contents to 85° C., BHT (0.185 g), 1-decanol (38.88 g), and HDI (59.01 g) were added sequentially to the reactor and allowed to mix for 5 min. Bismuth octoate (28% Bi, 4.25 g) was then added to the reactor and the temperature of the mixture was maintained at 85° C. with stirring for 20 min. The resulting molten polymer was removed from the reactor and cooled. Prior to testing in coating formulations, portions of this solid polymer were then dissolved in water to form a solution containing 18.5 wt % polymer based on the total weight of the solution.

RM5—Preparation of a Rheology Modifier with cLog P of 6.33

PEG 8000 (1854.8 g) and LUMULSE POE(26) glycerine (46.60 g) were heated to 110° C. in vacuo in a batch melt reactor for 2 h. After cooling the reactor contents to 85° C., BHT (0.202 g), 2-butyl-1-octanol (47.81 g), and HDI (63.41 g) were added sequentially to the reactor and allowed to mix for 5 min. Bismuth octoate (28% Bi, 4.64 g) was then added to the reactor and the temperature of the mixture was maintained at 85° C. with stirring for 20 min. The resulting molten polymer was removed from the reactor and cooled. Prior to testing in coating formulations, portions of this solid polymer were then dissolved in water to form a solution containing 17.5 wt % polymer based on the total weight of the solution.

RM6—Preparation of a Rheology Modifier with cLogP of 4.37

A mixture of PEG 8000 (150 g) and toluene (400 g) were added to a vessel and dried by azeotropic distillation. The mixture was cooled to 90° C., at which time $H_{12}MDI$ (6.63 g) was added to the mixture. The mixture was stirred for 5 min, and dibutyltin dilaurate (0.21 g) was added. The mixture was stirred for 1 h, then cooled to 80° C. followed by the addition of N-methylbenzylamine (2.23 g). The mixture was stirred for an additional 1 h, then cooled to 60° C. Solvent was removed in vacuo and the polymer was isolated.

RM7—Preparation of a Rheology Modifier with cLogP of 4.62

A mixture of PEG 8000 (150 g) and toluene (400 g) were added to a vessel and dried by azeotropic distillation. The mixture was cooled to 90° C., at which time HDI (4.25 g) was added to the mixture. The mixture was stirred for 5 min and dibutyltin dilaurate (0.21 g) was added. The mixture was stirred for 1 h, then cooled to 80° C. followed by addition of N,N-dibenzylaminoethanol (4.44 g). The mixture was stirred for an additional 1 h, then cooled to 60° C. Solvent was removed in vacuo and the polymer was isolated.

Example 1—Paint Thickened with RM1 at 18% PVC, 35.6% VS

A. Premix

Intermediate 1 (462 g), water (109 g), KRONOS 4311 $TiO_2$ slurry (412 g, 76.5% solids), and ammonia (0.88 g, 29% aq.) were mixed using an overhead mixer for 10 min. Intermediate 1 (440 g), BYK-348 surfactant (4.8 g), FOAM-STAR A-34 defoamer (2.0 g), water (6.6 g) and TEXANOL coalescent (12.0 g) were then added sequentially and mixed for an additional 5 min.

B. Letdown

Premix (193.4 g), water (3.95 g), RM1 (5.63 g, 25% solids), and ACRYSOL™ RM-995 Rheology Modifier (0.91 g, 20% solids) were mixed together using an overhead mixture for 10 to 15 min to complete the formulation.

Example 2—Paint Thickened with RM2 at 18% PVC, 35.6% VS

A. Premix

The premix was prepared the same as described in Example 1, Part A.

B. Letdown

Premix (193.4 g), water (3.93 g), RM2 (5.62 g, 20% solids), and ACRYSOL™ RM-995 Rheology Modifier (0.94 g, 20% solids) were mixed together using an overhead mixture for 10 to 15 min to complete the formulation.

Example 3—Paint Thickened with RM1 at 18% PVC, 38.9% VS

A. Premix

Intermediate 1 (404 g), water (46.3 g), and KRONOS 4311 $TiO_2$ slurry (361 g, 76.5% solids), and ammonia (0.68, 28% aq.) were mixed using an overhead mixer for 10 min. Intermediate 1 (385 g), BYK-348 surfactant (4.2 g), FOAM-STAR A-34 defoamer (1.8 g), and TEXANOL coalescent (10.5 g) were then added sequentially and mixed for an additional 5 min.

B. Letdown

Premix (202.1 g), water (0.31 g), RM1 (4.09 g, 25% solids), and ACRYSOL™ RM-995 Rheology Modifier (0.49 g, 20% solids) were mixed together using an overhead mixture for 10 to 15 min to complete the formulation.

Comparative Example 1—Paint Thickened with RM3 at 18% PVC, 35.6% VS

A. Premix

The premix was prepared the same as described in Example 1, Part A.

B. Letdown

Premix (193.4 g), water (4.51 g), and RM3 (5.98 g, 20.0% solids) were mixed together using an overhead mixture for 10 to 15 min to complete the formulation.

Comparative Example 2—Paint Thickened with RM4 at 18% PVC, 35.6% VS

A. Premix

The premix was prepared the same as described in Example 1, Part A.

B. Letdown

Premix (193.4 g), water (6.47 g), and RM3 (4.02 g, 20.0% solids) were mixed together using an overhead mixture for 10 to 15 min to complete the formulation.

Comparative Example 3—Paint Thickened with RM5 at 18% PVC, 35.6% VS

A. Premix

The premix was prepared the same as described in Example 1, Part A.

B. Letdown

Premix (193.4 g), water (6.92 g), and RM5 (3.57 g, 17.5% solids) were mixed together using an overhead mixture for 10 to 15 min to complete the formulation.

B. Letdown

Premix (202.1 g), water (0.31 g), RM1 (4.09 g, 25% solids), and ACRYSOL™ RM-995 Rheology Modifier (0.49 g, 20% solids) were mixed together using an overhead mixture for 10 to 15 min to complete the formulation.

Comparative Example 4—Paint Thickened with RM3 at 18% PVC, 38.9% VS

A. Premix

The premix was prepared the same as described in Example 3, Part A.

B. Letdown

Premix (202.1 g), water (0.25 g), and RM3 (4.64 g, 20% solids) were mixed together using an overhead mixture for 10 to 15 min to complete the formulation.

Comparative Example 5—Paint Thickened with RM4 at 18% PVC, 38.9% VS

A. Premix

The premix was prepared the same as described in Example 3, Part A.

B. Letdown

Premix (202.1 g), water (1.92 g), and RM4 (2.97 g, 18.5% solids) were mixed together using an overhead mixture for 10 to 15 min to complete the formulation.

Example 4—Paint Thickened with RM6 at 18% PVC, 38.9% VS

A. Premix
The premix was prepared the same as described in Example 3, Part A.
B. Letdown
Premix (197.8 g), water (0.43 g), RM6 (8.30 g, 20% solids), and ACRYSOL™ RM-995 Rheology Modifier (0.44 g, 20% solids) were mixed together using an overhead mixture for 10 to 15 min to complete the formulation.

Example 5—Paint Thickened with RM7 at 18% PVC, 38.9% VS

A. Premix
The premix was prepared the same as described in Example 3, Part A.
B. Letdown
Premix (197.8 g), water (5.15 g), RM7 (3.76 g, 25% solids), and ACRYSOL™ RM-995 Rheology Modifier (0.27 g, 20% solids) were mixed together using an overhead mixture for 10 to 15 min to complete the formulation.

Example 6—Paint Thickened with RM6 at 18% PVC, 38.9% VS

A. Premix
Intermediate 1 (404 g) and KRONOS 4311 $TiO_2$ slurry (361 g, 76.5% solids), and ammonia (0.68, 28%) were mixed using an overhead mixer for 10 min. Intermediate 1 (385 g), BYK-348 surfactant (4.2 g), FOAMSTAR A-34 defoamer (1.8 g), and TEXANOL coalescent (10.5 g) were then added sequentially and mixed for an additional 5 min.
B. Letdown
Premix (194.38 g), water (5.16 g), and RM6 (6.99 g, 20% solids), and ACRYSOL™ RM-995 Rheology Modifier (0.45 g, 20% solids) were mixed together using an overhead mixture for 10 to 15 min to complete the formulation.

Example 7—Paint Thickened with RM7 at 18% PVC, 38.9% VS

A. Premix
The premix was prepared the same as described in Example 3, Part A.
B. Letdown
Premix (202.1 g), water (2.05 g), and RM7 (2.51 g, 25% solids), and ACRYSOL™ RM-995 Rheology Modifier (0.33 g, 20% solids) were mixed together using an overhead mixture for 10 to 15 min to complete the formulation.

Comparative Example 6—Paint Thickened with RM4 at 18% PVC, 38.9% VS

A. Premix
The premix was prepared the same as described in Example 3, Part A.
B. Letdown
Premix (202.1 g), water (2.05 g), and RM4 (2.51 g, 20% solids), and ACRYSOL™ RM-995 Rheology Modifier (0.33 g, 20% solids) were mixed together using an overhead mixture for 10 to 15 min to complete the formulation.
Table 1 illustrates KU and ICI viscosities (KU $\eta$ and ICI $\eta$ respectively) for amounts of RM-995 thickener added to 18 PVC paint samples. The added thickener is RM-995 in dry lbs/100 gal.

TABLE 1

Viscosity Profiles for Thickener Added to 18 PVC Paints

| Sample No. | VS % | cLog P | RM-995 | RM# | KU $\eta$ | ICI $\eta$ (Pa·s) |
|---|---|---|---|---|---|---|
| Example 1 | 35.6 | 4.34 | 1.40 | 1 | 100.4 | 1.34 |
| Example 2 | 35.6 | 4.68 | 0.94 | 2 | 97.0 | 1.25 |
| Comp Ex 1 | 35.6 | 5.74 | 0.00 | 3 | 103.0 | 1.36 |
| Comp Ex 2 | 35.6 | 5.40 | 0.00 | 4 | 99.5 | 1.36 |
| Comp Ex 3 | 35.6 | 6.33 | 0.00 | 5 | 123.3 | 1.30 |
| Example 3 | 38.9 | 4.34 | 0.49 | 1 | 97.4 | 1.38 |
| Example 4 | 38.9 | 4.62 | 0.45 | 7 | 103 | 1.41 |
| Comp Ex 4 | 38.9 | 5.74 | 0.00 | 3 | 105.4 | 1.32 |
| Comp Ex 5 | 38.9 | 5.40 | 0.00 | 4 | 103.1 | 1.32 |
| Example 5 | 38.9 | 4.34 | 0.30 | 1 | 90 | 1.02 |
| Example 6 | 38.9 | 4.37 | 0.45 | 6 | 92 | 0.97 |
| Example 7 | 38.9 | 4.62 | 0.33 | 7 | 88 | 1.04 |
| Comp Ex 6 | 38.9 | 5.40 | 0 | 4 | 95 | 1.05 |

For Examples 1-4 and Comparative Examples 1-5, the paint viscosity was targeted at 100±3 KU and 1.3±0.1 Pa·s, whereas for the remaining samples the paint viscosity was targeted at 90±3 KU and 1.0±0.1 Pa·s. The data demonstrate that RM1, which has a cLog P of 4.34, accommodates the highest use levels of RM-995 without exceeding the Stormer viscosity target for both levels of VS studied. RM3, RM4, and RM5, all of which have cLog P values >5.0, match or exceed the KU viscosity target without any RM-995 added when targeted to the same ICI viscosity. However, the use level for KU builders is dependent on the paint formulation studied. At 38.9% VS, RM1, RM6, and RM7 were shown to be effective with RM-995 as a co-thickener. RM3 and RM4, both of which have cLog P >4.8, match or exceed the KU viscosity target without any RM-995 added. The ability to add co-thickener selectively to increase Stormer viscosity in the inventive paint formulations allows for enhanced flexibility toward designed rheology; this flexibility allows for the optimization of performance characteristics such as sag and leveling, viscosity stability, viscosity retention upon tinting, and colorant compatibility.

The invention claimed is:
1. A composition comprising an aqueous dispersion of a) from 0.02 to 2 weight percent, based on the weight of the composition, of an associative thickener having a hydrophobic portion with a calculated log P in the range of from 2.7 to 4.8; and b) from 5 to 60 weight percent, based on the weight of the composition, of composite particles comprising phosphorus acid functionalized polymer particles adsorbed to the surfaces of $TiO_2$ particles; wherein the volume solids content of the composition is in the range of from 30 to 44 volume percent, with the proviso that when the volume solids content is in the range of from 30 to 36 volume percent, the calculated log P of the hydrophobic portion of the associative thickener is in the range of from 4.0 to 4.8.
2. The composition of claim 1 wherein the associative thickener comprises a polyether which is a hydrophobically modified ethylene oxide urethane polymer having hydrophobic portion that is represented by the following structure:

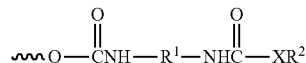

wherein X is O or $NR^{2'}$ with the proviso that
X is O and $R^1$ is —$H_{12}MDI$— when $R^2$ is $CH_3(CH_2)_3$— or $CH_3(CH_2)_2$—; or X is O and $R^1$ is —IPDI— when $R^2$ is $CH_3(CH_2)_5$— or $CH_3(CH_2)_4$— or $CH_3(CH_2)_3$ or benzyl; or X is O and $R^1$ is —HDI— when $R^2$ is $CH_3(CH_2)_7$— or $CH_3(CH_2)_6$— or $CH_3(CH_2)_5$— or $CH_3(CH_2)_4$—; or X is $NR^{2'}$ and $R^1$ is —$H_{12}$MDI— when $R^2$ is benzyl and $R^{2'}$ is $CH_3$—; or X is $NR^{2'}$ and $R^1$ is —$H_{12}$MDI— when $R^2$ is cyclohexyl and $R^{2'}$ is H; or X is $NR^{2'}$ and $R^1$ is —HDI— when $R^2$ and $R^{2'}$ are each benzyl, cyclohexyl, $CH_3(CH_2)_3$—, or $CH_3(CH_2)_4$—; or X is $NR^{2'}$ and $R^1$ is —HDI— when $R^2$ is $CH_3(CH_2)_5$—, $CH_3(CH_2)_6$—, or $CH_3(CH_2)_7$— and $R^{2'}$ is H; or X is $NR^{2'}$ and $R^1$ is —IPDI— when $R^2$ is $CH_3(CH_2)_5$— and $R^{2'}$ is H; or X is $NR^{2'}$ and $R^1$ is when $R^2$ and $R^{2'}$ are $CH_3(CH_2)_3$—.

3. The composition of claim 1 wherein the associative thickener has a hydrophobic portion represented by

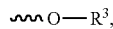

where $R^3$ is n-undecyl, n-decyl, n-nonyl, n-octyl, 2-ethylhexyl, 3,5,5-trimethylhexyl, 3,7-dimethyloctyl, dibenzylaminoethyl, 2-propylheptyl, diamylaminoethyl, n-octylphenyl, or 2,6-dimethylheptyl.

4. The composition of claim 1 wherein the associative thickener has a hydrophobic portion with a calculated log P in the range of from 4.2 to 4.6.

5. The composition of claim 4 wherein the associative thickener comprises a polyether which is a hydrophobically modified ethylene oxide urethane polymer having hydrophobic portion that is represented by the following structure:

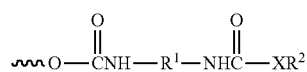

wherein X is O or $NR^{2'}$ with the proviso that

X is O and $R^1$ is —IPDI— when $R^2$ is $CH_3(CH_2)_4$—; or

X is O and $R^1$ is —HDI— when $R^2$ is $CH_3(CH_2)_7$—; or

X is $NR^{2'}$ and $R^1$ is —$H_{12}$MDI— when $R^2$ is benzyl and $R^{2'}$ is $CH_3$—; or X is $NR^{2'}$ and $R^1$ is when $R^2$ is $CH_3(CH_2)_5$— and $R^{2'}$ is H.

6. The composition of claim 3 wherein $R^3$ is undecyl or n-octylphenyl.

7. The composition of claim 1 which comprises, based on the weight of the composition, from 0.1 to 1 weight percent of the associative thickener and from 20 to 40 weight percent of the composite particles comprising phosphorus acid functionalized polymer particles adsorbed to the surfaces of $TiO_2$ particles, wherein polymer particles comprise a) from 0.5 to 15 weight percent, based on the weight of the polymer particles, of structural units of a phosphorus acid monomer; b) from 0.2 to 10 weight percent structural units of a a carboxylic acid monomer or a sulfur acid monomer or salts thereof or combinations thereof; and c) from 50 to 95 weight percent structural units of i) methyl methacrylate or styrene or a combination thereof; and ii) ethyl acrylate, butyl acrylate, or 2-ethylhexyl acrylate or a combination thereof.

* * * * *